United States Patent
Wander

(10) Patent No.: US 8,025,079 B2
(45) Date of Patent: Sep. 27, 2011

(54) CLEAN OUT TUBE CHECK VALVE

(76) Inventor: Lloyd J. Wander, Venice, FL (US)

( * ) Notice: Subject to any disclaimer, the term of this patent is extended or adjusted under 35 U.S.C. 154(b) by 265 days.

(21) Appl. No.: 11/877,342

(22) Filed: Oct. 23, 2007

(65) Prior Publication Data

US 2008/0173360 A1    Jul. 24, 2008

Related U.S. Application Data

(60) Provisional application No. 60/881,646, filed on Jan. 22, 2007.

(51) Int. Cl.
*F16L 55/10*    (2006.01)

(52) U.S. Cl. .............. 138/90; 138/89; 138/96 T

(58) Field of Classification Search .......... 138/89, 138/90, 96 T
See application file for complete search history.

(56) References Cited

U.S. PATENT DOCUMENTS

| | | | | |
|---|---|---|---|---|
| 2,241,560 A * | 5/1941 | Schouler | .......... | 15/104.33 |
| 2,329,997 A * | 9/1943 | Luff | .......... | 137/247.43 |
| 2,366,975 A * | 1/1945 | McChesney | .......... | 138/89 |
| 2,374,947 A * | 5/1945 | Nicholson | .......... | 138/90 |
| 2,471,301 A * | 5/1949 | Boosey | .......... | 52/220.8 |
| 2,801,023 A * | 7/1957 | Baker et al. | .......... | 220/304 |
| 2,988,111 A * | 6/1961 | Ver Nooy | .......... | 138/89 |
| 3,036,601 A * | 5/1962 | Fabian, Jr et al. | .......... | 138/89 |
| 3,155,116 A * | 11/1964 | Ver Nooy | .......... | 138/89 |
| 3,285,289 A * | 11/1966 | Titus | .......... | 138/89 |
| 3,765,456 A * | 10/1973 | Karpenko | .......... | 138/89 |
| 3,814,276 A * | 6/1974 | Van Gordon et al. | .......... | 220/259.4 |
| 4,140,240 A * | 2/1979 | Platts | .......... | 220/323 |
| 4,144,909 A * | 3/1979 | Harrison | .......... | 138/94 |
| 4,281,422 A * | 8/1981 | Simonelli | .......... | 4/496 |
| 4,506,705 A * | 3/1985 | Thompson | .......... | 138/89 |
| 4,764,332 A * | 8/1988 | Guina | .......... | 376/203 |
| 4,886,121 A * | 12/1989 | Demny et al. | .......... | 166/382 |
| 5,038,818 A * | 8/1991 | Jiles | .......... | 137/317 |
| 5,044,560 A * | 9/1991 | Cheng | .......... | 239/476 |
| 5,209,257 A * | 5/1993 | Baker, Jr. | .......... | 137/315.04 |
| 6,250,337 B1 * | 6/2001 | Bevacco | .......... | 138/89 |
| 6,886,592 B1 | 5/2005 | Hart, Jr. | | |

* cited by examiner

*Primary Examiner* — James Hook
(74) *Attorney, Agent, or Firm* — Gifford, Krass, Sprinkle, Anderson & Citkowski, P.C.

(57) ABSTRACT

Disclosed is a check valve for preventing liquid from entering an attached tube. The check valve includes a cylindrical housing having an inner surface and a removable plug that is at least partially within the housing. The plus has a side wall with at least part of the sidewall sloping in an inwardly direction from a top surface to a bottom surface towards a central axis. The side wall is operable to contact the inner surface of the housing and form a seal, thereby preventing liquid from passing through the housing, the housing being fixedly attached to an inner surface of a tube.

10 Claims, 1 Drawing Sheet

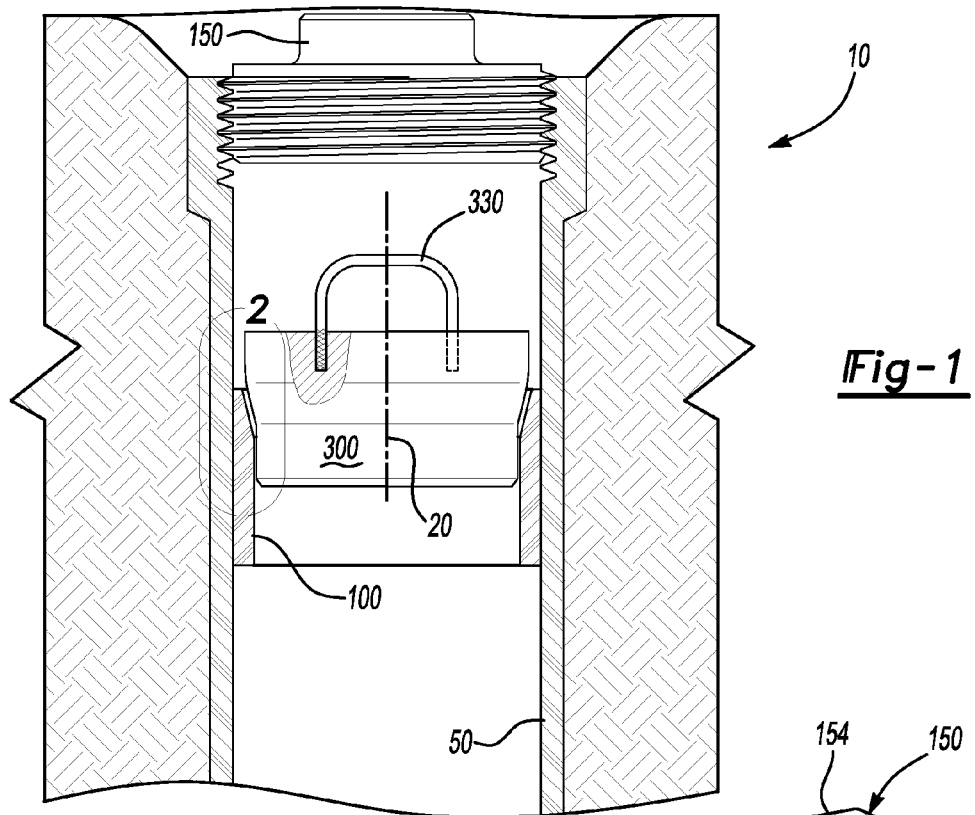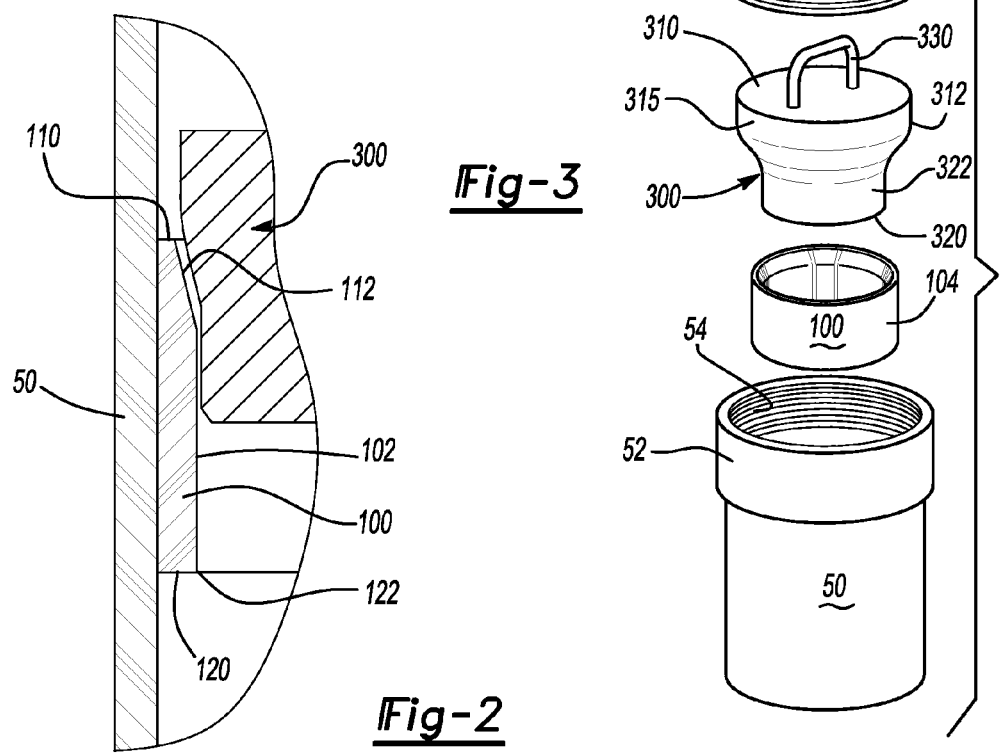

CLEAN OUT TUBE CHECK VALVE

CROSS-REFERENCE TO RELATED APPLICATIONS

This application claims priority of U.S. Provisional Patent Application Ser. No. 60/881,646 filed Jan. 22, 2007, entitled "LDL Clean Out Check Valve" which is incorporated herein by reference.

FIELD OF THE INVENTION

This invention relates generally to a check valve. More specifically, the invention relates to a check valve for a sewer clean out.

BACKGROUND OF THE INVENTION

One of the key features of a municipal sewer system is a "clean out" which is used to provide access to the various piping and drain components of a sanitary sewer system. In particular, a clean out allows for the cleaning of sewer drain piping when a stoppage occurs. The clean out, which includes piping that connects with a sewer lateral drainpipe, also includes a clean out cap which prevents groundwater from entering the clean out piping and thus the sewer system.

One of the most common causes for the introduction of groundwater into a sewer system is a broken or missing clean out cap at a clean out location. The introduction of groundwater into a sewer is a common problem for wastewater utilities and is typically the primary cause of wastewater backups and overflows. Not only are property damage and health hazards caused by wastewater backups and overflows, but processing costs can dramatically increase for a wastewater treatment utility company. Therefore there is a need for an article that prevents the introduction of groundwater into a sewer system through a clean out when the clean out cap is broken or missing.

SUMMARY OF THE INVENTION

Disclosed is a check valve for preventing liquid from entering an attached tube. The check valve includes a cylindrical housing having all inner surface and a removable plug that is at least partially within the housing. The plug has a side wall with at least part of the sidewall sloping in an inwardly direction from a top surface to a bottom surface towards a central axis. The side wall is operable to contact the inner surface of the housing and form a seal, thereby preventing liquid from passing through the housing, the housing being, fixedly attached to an inner surface of a tube.

The housing has an outer diameter that is less than an inner diameter of the tube to be attached thereto, thereby allowing the housing to slide within the tube. The tube can also include threads which are operable to accept a threaded cap. The removable plug has a handle which allows for the plug to be removed from the housing when the handle is pulled upon. The handle can be made from a rigid material illustratively including metals, alloys and plastics. The housing can also be made from a rigid material, illustratively including metals, alloys and plastics. The plug is made from an elastomer.

BRIEF DESCRIPTION OF THE DRAWINGS

FIG. 1 is a cross-sectional side view of one embodiment of the present invention.

FIG. 2 is an enlarged view of the section labeled '2' shown in FIG. 1; and

FIG. 3 is an exploded perspective view of one embodiment of the present invention.

DETAILED DESCRIPTION OF THE PREFERRED EMBODIMENTS

The present invention comprises a check valve to prevent liquid from entering a piping system. As such, the present invention has utility as a valve for preventing unwanted liquids from entering a piping system such as a sanitary sewer system.

The check valve of the present invention includes a cylindrical housing with a removable plug which has a sloping side wall that can contact an inner surface of the housing and provide a seal. The housing can be fixedly attached within a clean out tube of a sanitary sewer system. For the purposes of the present inventions the term tube includes piping and other relatively high length:width aspect ratio long hollow structures that afford liquids and/or gases to pass therethrough.

Referring now to FIGS. 1-3, there is shown at least one embodiment of the present invention wherein the check valve shown generally at 10 includes a check valve housing 100 and a removable plug, 300 within a clean out tube 50. An enlarged view of the section labeled '2' is shown in FIG. 2. An outer surface 104 of the housing 100 is dimensioned such that the housing 100 can be placed within the clean out tube 50. In some instances the housing 100 is fixedly attached to the clean out tube 50 using an adhesive.

The removable plug 300 has a top surface 310 and a bottom surface 320. Adjoining the top surface 310 and the bottom surface 320 is a side wall 315. Although not required, the removable plug can have an upper section 312 and a lower section 322 as shown in FIG. 3. A diameter of the upper section 312 can be greater than a diameter of the lower section 322. Thus, at least part of the side wall 315 slopes in an inwardly direction from the top surface 310 to the bottom surface 320 towards a central axis 20. As illustrated in FIG. 2, the side wall 315 of the lower section 322 can come into contact with an inner surface 102 of the housing 100 when the plug 300 is placed within the housing 100 and moved in a direction towards a bottom end 120. In this manner, a seal is provided between the inner surface 102 of the housing 100 and the plug 300.

Optionally included is a clean out cap 150 with a cap turning device 154. Although illustrated as an elevated four-sided region in the figures, other cap turning devices known to those skilled in the art are within the scope of the present invention, illustratively including screwdriver accepting slots, handles, turning knobs and the like. The clean out cap 150 can have external threads 152 that afford for screwing of the cap 150 into a cap end 52 of the clean out tube 50 having internal threads 54 and thereby provide attachment of the cap 150 to the clean out tube 50. It is appreciated that the cap end 52 can accept a non-threaded cap and in fact does not require threads 54.

The removable plug 300 can also include a handle 330. The handle 330 is made from a rigid material, illustratively in tiding metals, alloys and plastics. The housing 100 is also made from a rigid material, illustratively including metals, alloys and plastics such as polyvinylchloride (PVC). The removable plug 300 is made from an elastomer such that appropriate chemical compatibility, temperature, sealing pressure, lubrication requirements, cost requirements and the like are met.

In one embodiment, the housing 100 has an outer diameter that is less than an inner diameter of the clean out tube 50. In one instance the outer diameter of the housing 100 is less than the inner diameter of the clean out tube 50 between 0.002 inches to 0.200 inches. In another instance, the outer diameter is less than the inner diameter between 0.002 inches to 0.100 inches. In this manner, the housing 100 is operable to slide within the clean out tube 50 and be attached thereto. In one example, the housing 100 fits within a 4-inch sewer pipe with the housing having a wall thickness of 0.250 inches and the removable plug having a diameter at the bottom surface less than 3.500 inches. The housing, 100 can be fixedly attached to the clean out tube 50 using, any attachment means known to those skilled in the art, illustratively including adhesives, threads, press fitting and/or welding.

It is appreciated that the present invention is operable by fixedly attaching, the housing, 100 within the clean out tube 50, placing the removable plug 300 at least partially within the housing 100 and moving the plug 300 in a direction towards the bottom end 120 until the side wall 115 contacts the inner surface 102 and provides a seal. Once the plug 300 is in position, the cap 150 can be attached to the clean out tube 50. In this manner, if the cap 150 is damaged and/or removed groundwater is still prevented from entering the clean out tube 50. It is also appreciated that if inspection and/or repair of the sewer system is required, the removable plug 300 can be removed from the clean out the 50 by exerting a pill force on the handle 330. In this manner, a check valve is provided that prevents liquid from entering and passing through a tube.

The foregoing drawings, discussion and description are illustrative of specific embodiments of the present invention but they are not meant to be limitations upon the practice thereof. Numerous modifications and variations of the invention will be readily apparent to those of skill in the art in view of the teaching presented herein. It is the following claims, including all equivalents, which decline the scope of the invention.

The invention claimed is:

1. A check valve for preventing liquid from entering a pipe system comprising:
   a housing operable to be positioned in a pipe, the housing formed of a rigid material selected from the group consisting of metals, alloys and plastics, and the housing also including an exterior surface, open ends, and an inner surface, the exterior surface being dimensioned to engage an interior surface of a pipe, and the inner surface being cylindrical and having a tapered portion proximate at least one end;
   a removable plug positioned at least partially within said housing, said plug having a top surface, a bottom surface, a handle and a side wall, the handle consisting of a graspable member positioned on the top surface and the side wall consisting of a lower section proximate the bottom surface having a first diameter, an upper section proximate the top surface having a second diameter greater than the first diameter and a sloping portion extending between the upper section and the lower section, the sloping portion of the plug engaging the tapered portion of the housing, and the lower section of the plug engaging the inner surface of the housing, to frictionally secure the plug in the housing and forming a seal between the housing and plug.

2. The check valve of claim 1, wherein said handle comprises a rigid material selected from the group consisting of metals, alloys and plastics.

3. The check valve of claim 1, wherein said plug comprises an elastomer.

4. The check valve of claim 1, wherein said handle extends from the top surface of the plug.

5. A check valve for a sewer clean out tube for preventing liquid from entering the clean out tube from the surface comprising:
   a clean out tube having at least one open end and an inner surface, and the inner surface of the clean out tube being threaded proximate the open end;
   a tubular housing having an inner surface and an exterior surface, the exterior surface having an outer diameter less than an inner diameter of said clean out tube, the inner surface of the housing having a tapered portion proximate at least one open end of the housing, and said housing being fixedly attached within said clean out tube;
   a cap threadably mounted to the open end of the clean out tube; and
   a removable plug positioned at least partially within said housing, said plug having a top surface, a bottom surface, a handle and a side wall, the plug being oriented in the housing and tube so that the top surface faces the open end of the tube, the handle being positioned on the top surface so as to be graspable by a user upon removable of the cap from the open end of the clean out tube and also being spaced from the cap when the cap is mounted to the open end and the side wall including a lower section, an upper section and a sloping portion, the lower section being positioned proximate the bottom surface and having a first diameter, the upper section being positioned proximate the top surface and having a second diameter greater than the first diameter, and the sloping portion extending between the upper section and the lower section, the sloping portion of the plug engaging the tapered portion of the housing, and the lower section of the plug engaging the inner surface of the housing, to frictionally secure the plug to the housing, and the contact between the plug and the inner surface of the housing forming a seal preventing liquid from entering the clean out tube from the surface.

6. The check valve of claim 5, wherein said housing is fixedly attached to said clean out tube using adhesive.

7. The check valve of claim 5, wherein said housing and said handle are made from a rigid material selected from the group consisting of metals, alloys and plastics.

8. The check valve of claim 5, wherein said plug is made from an elastomer.

9. The check valve of claim 5, wherein the contact between said plug and said inner surface of said housing forms a seal operable to prevent liquid from flowing past said seal.

10. The check valve of claim 5, wherein said cap is a one-piece cap.

* * * * *